(12) United States Patent
Mitsunami et al.

(10) Patent No.: US 11,669,992 B2
(45) Date of Patent: Jun. 6, 2023

(54) DATA PROCESSING

(71) Applicant: SeeChange Technologies Limited, Manchester (GB)

(72) Inventors: Koki Mitsunami, Altrincham (GB); Michael Andrew Pallister, Beaconsfield (GB)

(73) Assignee: SEECHANGE TECHNOLOGIES LIMITED, Manchester (GB)

( * ) Notice: Subject to any disclaimer, the term of this patent is extended or adjusted under 35 U.S.C. 154(b) by 161 days.

(21) Appl. No.: 17/162,863

(22) Filed: Jan. 29, 2021

(65) Prior Publication Data

US 2021/0287391 A1    Sep. 16, 2021

(30) Foreign Application Priority Data

Mar. 12, 2020    (GB) ..................................... 2003630

(51) Int. Cl.
*G06T 7/70* (2017.01)
*G06T 7/80* (2017.01)
(Continued)

(52) U.S. Cl.
CPC ................ *G06T 7/70* (2017.01); *G06T 5/006* (2013.01); *G06T 7/55* (2017.01); *G06T 7/80* (2017.01);
(Continued)

(58) Field of Classification Search
CPC .. G06T 7/70; G06T 5/006; G06T 7/55; G06T 7/80; G06T 2207/20224;
(Continued)

(56) References Cited

U.S. PATENT DOCUMENTS

2013/0259381 A1    10/2013  Srinivasen et al.
2014/0152647 A1*   6/2014   Tao .......................... G06T 7/557
                                                                345/419
(Continued)

OTHER PUBLICATIONS

UKIPO Search Report dated Aug. 20, 2020 for Application No. GB2003630.7.
(Continued)

*Primary Examiner* — Chan S Park
*Assistant Examiner* — Daniel C Chang
(74) *Attorney, Agent, or Firm* — Nixon & Vanderhye P.C.

(57) ABSTRACT

A computer-implemented method comprises obtaining first data comprising a first collection of coordinate data representing a position, or positions, of a first group of one or more objects detected in a first frame of a scene and obtaining second data comprising a second collection of coordinate data representing a position, or positions, of a second group of one or more objects detected in a second frame of the scene, wherein the second frame represents a different view of the scene than the first frame. The method further comprises determining whether any of the first group of objects correspond to any of the second group of objects in the scene based on the first collection of coordinate data and the second collection of coordinate data, wherein the first frame and the second frame are obtained from image data captured from a single camera position.

15 Claims, 6 Drawing Sheets

(51) Int. Cl.
  *G06T 7/55* (2017.01)
  *G06T 5/00* (2006.01)
  *G06V 20/00* (2022.01)
  *G06V 40/10* (2022.01)

(52) U.S. Cl.
  CPC .............. *G06V 20/00* (2022.01); *G06V 40/10* (2022.01); *G06T 2207/20224* (2013.01)

(58) Field of Classification Search
  CPC . G06T 2207/20021; G06T 2207/30196; G06T 2207/30232; G06T 2207/30242; G06V 20/00; G06V 40/10
  See application file for complete search history.

(56) References Cited

U.S. PATENT DOCUMENTS

| | | | | |
|---|---|---|---|---|
| 2014/0254876 | A1* | 9/2014 | Srinivasan | G06V 20/53 382/103 |
| 2021/0118104 | A1* | 4/2021 | Kornienko | H04N 5/2628 |
| 2021/0225080 | A1* | 7/2021 | Yoshimura | G06T 15/205 |
| 2021/0354299 | A1* | 11/2021 | Xiong | B25J 13/089 |

OTHER PUBLICATIONS

Khan et al: "Tracking in Multiple Cameras with Overlapping FOV" Paper: Human Tracking in Multiple Cameras, Jul. 2001.

\* cited by examiner

DATA PROCESSING

CROSS-REFERENCE TO RELATED APPLICATIONS

This application claims priority to GB Application No. GB 2003630.7, filed Mar. 12, 2020, under 35 U.S.C. § 119(a). The above-referenced patent application is incorporated by reference in its entirety.

BACKGROUND OF THE INVENTION

Technical Field

The present invention relates to object detection, in particular, but not exclusively, the present invention relates to identifying objects in a scene from at least two frames

Background

Object detection is a process related to computer vision and image processing in which objects of a particular class can be detected in images and videos. In some cases, images of a scene may be captured by one or more cameras and object detection may be performed on the image captured of the scene.

Images of scenes may be captured and processed in a number of ways to perform analytics on the scene which is being captured in the images. When performing analytics, the quality and quantity of input data may be a determining factor in the value of the analytic deductions made from said data.

Certain lenses can be used to capture images or videos with a wide field or angle of view. For example, a fisheye lens is a wide-angle lens that can be used to capture wide panoramic or hemispherical images. Such lenses typically produce a distorted image, with certain parts of the image stretched or compressed compared with other parts. This generally leads to straight image features, such as a straight lines or edges, appearing curved rather than straight.

It is known to correct the distortion in an image captured by a fisheye lens to remove or reduce curvature of straight image features.

SUMMARY

According to a first aspect of the present invention, there is provided a computer-implemented method comprising:
  obtaining first data comprising a first collection of coordinate data representing a position, or positions, of a first group of one or more objects detected in a first frame of a scene;
  obtaining second data comprising a second collection of coordinate data representing a position, or positions, of a second group of one or more objects detected in a second frame of the scene, wherein the second frame represents a different view of the scene than the first frame; and
  determining whether any of the first group of objects correspond to any of the second group of objects in the scene based on the first collection of coordinate data and the second collection of coordinate data,
  wherein the first frame and the second frame are obtained from image data captured from a single camera position.

By identifying whether any objects detected in the first frame relate to the same objects in the scene as any objects detected in the second frame it is possible to identify duplicate detection of objects in the scene. In this way, data derived from the object detection applied to the first and second frames of the scene may be more accurate. By performing this determination on the basis of the coordinates of the first group of objects and the coordinates of the second group of objects in their respective frames it is possible for the method to be applied without access to the image data representing either of the first frame or the second frame. This in turn may increase the privacy and security of the video or image data as the method is capable of being performed without transmitting or sending the image data externally for processing. Further the processing may be computationally less expensive than in cases where duplicate object detection relies on object recognition algorithms applied to high resolution video or image data.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Object detection is a computer vision technique which can be used in a wide range of technical disciplines to generate data about a given scene. For example, object detection algorithms may be run on image data produced by a camera recording a scene to identify a number of, and in some cases movement of, particular objects in the scene.

The application of object detection may be useful in a number of scientific fields, for example, monitoring animal and fish species in a given area, identifying and tracking a number of people in a given space for data analytics, and generating traffic data for performing analytics. These cases are given as examples, but it is to be appreciated that there is a plurality of fields in which tracking a number, location, and movement of a given type of object is desirable.

In many cases, to capture information relating to an entire scene, more than one frame of image data is used. For example, depending on the size and geometry of the scene a plurality of frames of image data may be captured, each frame representing a different view of the scene. The number of different frames which are captured and the specific views which are shown in each frame may also be dependent on the camera placement and the type of camera which used, including for example a type of lens used in the camera. Where more than one frame is used to capture a scene there may be common regions between different frames of image data where the field of view of two or more of these frames overlap. In such a case, performing object detection may result in certain objects in the scene being counted more than once. It is therefore desirable to identify where duplicate detection occurs so that its results can be mitigated, and, in some cases, the likelihood of duplicate detection can be reduced.

In some cases, multiple frames of a scene are generated using image data captured from a single camera position. For example, a camera having a wide-angle lens, such as a fish-eye lens, may be used to capture an image of a scene in image data, and then one or more transformations may be applied to the image data to adjust a geometric distortion of the image. This can be performed on part of the image data to generate a frame representing part of the image of the scene, in which a geometric distortion of the image is corrected. Multiple different frames can be generated in this way resulting in a plurality of different frames showing different views of the scene captured using the single image sensor. Alternatively, a camera comprising a plurality of image sensors could be used. For example, a dome camera comprising two or more image sensors facing in different directions may be used to capture images of a scene, and in some cases these images of the scene may have overlapping regions. In further examples, a panoramic imaging technique may be used to capture the scene in image data captured using one or more image sensors at a single camera position. Multiple frames of a scene may then be generated by applying one or more operations to the panoramic image data. A multi-camera system may also be used, wherein a plurality of co-located cameras is provided. For example, a plurality of cameras, including at least one independently operable camera, may be included in a single dome camera housing. Any of the plurality of cameras included in the multi-camera system may be movable, may include a variable lens, and/or may include a wide-angle lens.

Certain examples described herein relate to a data processing system which is configured to receive data relating to the position, or positions, of objects in frames of image data representing different views and to compare these positions so that objects which are detected in more than one frame of the image data can be identified. In certain examples, the data processing system obtains first data comprising a first collection of coordinate data representing positions of a first group of one or more objects detected in a first frame of a scene. Second image data comprising a second collection of coordinate data representing positions of a second group of one or more objects detected in a second frame of the scene is obtained. The first collection of coordinate data and the second collection of coordinate data are then used in determining whether any of the first group of objects correspond to any of the second group of objects.

Certain examples described herein relate to an image processing system which is configured to obtain first and second image data representing a first frame of the scene and a second frame of the scene respectively. The image processing system then applies one or more object detection algorithms to determine a first collection of coordinate data corresponding to the locations of the first group of objects in the first frame and to determine a second collection of coordinate data corresponding to the locations of the second group of objects in the second frame.

Figure 1:
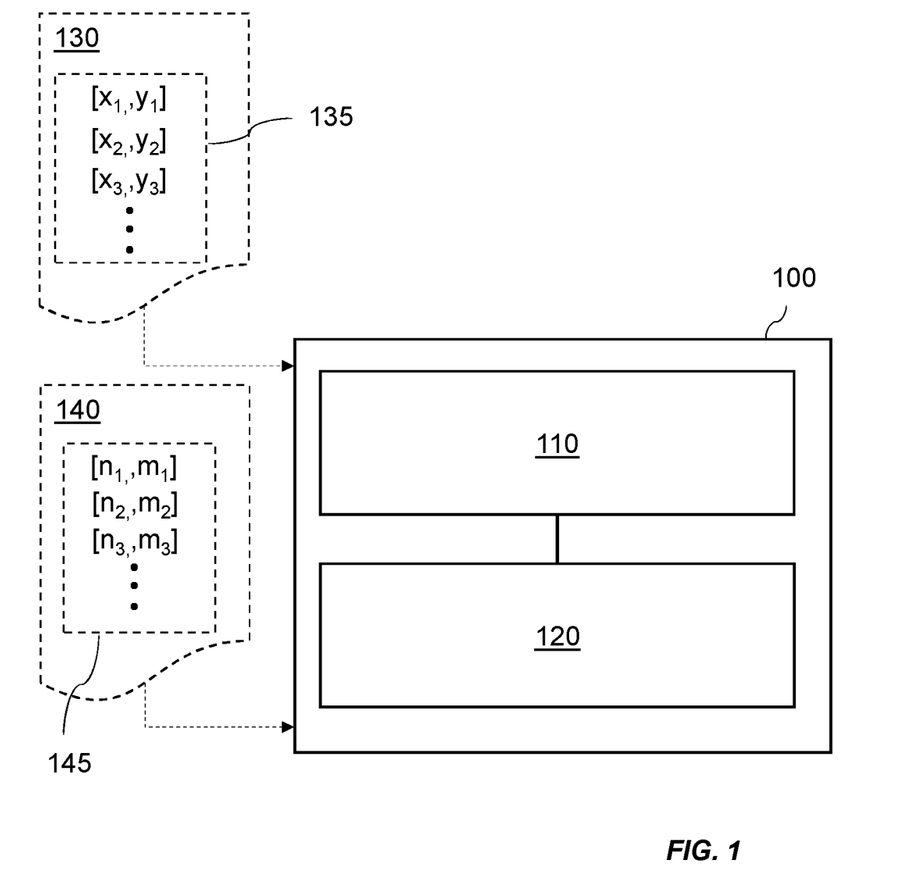
FIG. 1 is a schematic diagram showing a data processing system according to an example.

FIG. 1 shows a data processing system 100 according to an example. The data processing system 100 comprises at least one memory 110 and at least one processor 120. In some examples, the data processing system 100 is implemented as a system-on-chip or as fixed function hardware designed and constructed to carry out a method as described further below in relation to FIG. 2. Alternatively, the data processing system 100 may be implemented in a general-purpose computer. The at least one memory 110 may comprise any suitable combination of volatile and non-volatile memory including memory types such as Random-Access Memory (RAM), Static Random-Access Memory (SRAM), Dynamic Random-Access Memory (DRAM), Read-Only Memory (ROM), flash memory, Programmable Read-Only Memory (PROM), Erasable Programmable Read-Only Memory (EPROM), and Electrically Erasable Programmable Read-Only Memory (EEPROM). The at least one processor 120 may include a microprocessor, a general-purpose processor, such as a central processing unit (CPU), an application specific integrated circuit, a field programmable gate array (FPGA) or other programmable logic device, a discrete gate or transistor logic, discrete hardware components, or any suitable combination thereof designed to perform the functions described herein. The processor 240 may be or may include a graphics processing unit (GPU). A processor may also be implemented as a combination of computing devices, e.g., a combination of a CPU and a GPU, a plurality of microprocessors, one or more microprocessors in conjunction with a CPU core, or any other such configuration.

Figure 2:
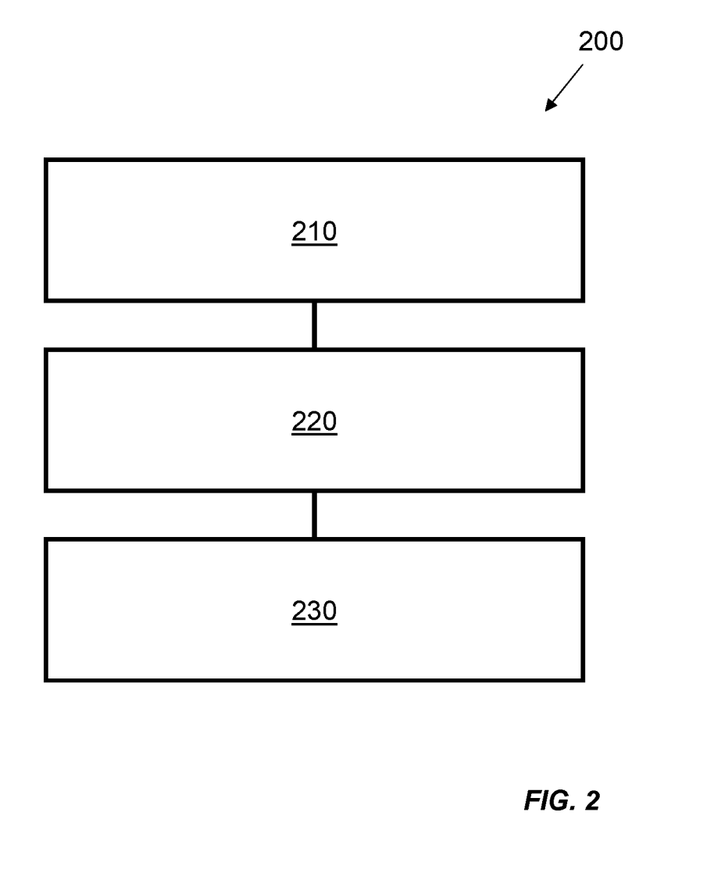
FIG. 2 is a flow chart of a method according to an example.

The data processing system 100 is configured to perform a method 200 illustrated by a flow chart 210 to 230 shown in FIG. 2. At a first block 210 of the method 200 the data processing system 100 is adapted to obtain first data 130 comprising a first collection of coordinate data 135 representing a position, or positions, of a first group of one or more objects detected in a first frame of a scene. The data processing system 100 is also configured, at a second block 220 of the method 200, to obtain second data 140 comprising a second collection of coordinate data 145 representing a position, or positions, of a second group of one or more objects in a second frame of the scene. The first frame of the scene represents a different view of the scene than the second frame of the scene. Both the first frame of the scene and the second frame of the scene are obtained from image data captured at a single camera position, for example the location of a single camera or the location of a multi-camera system comprising two or more cameras at a single camera position. The data processing system 100 then, at a third block 230, determines whether any of the first group of objects correspond to any of the second group of objects in the scene based on the first collection of coordinate data 135 and the second collection of coordinate data 140.

In the example shown in FIG. 1, the first data 130 and the second data 140 are received by the data processing system 100. The data processing system 100 may comprise one or more interfaces for receiving the first data 130 and the second data 140, for example from an image processing system. An image processing system will be described further below with respect to FIG. 5. The data processing system 100 may receive the first data 130 and second data 140 over a network. For example, a local area network or a wide area network, such as the internet. In alternative examples, the first data 130 and the second data 140 may be obtained from memory 110 in the data processing system 100 or may be input via an external memory interface, such as a flash drive interface.

Figure 3:
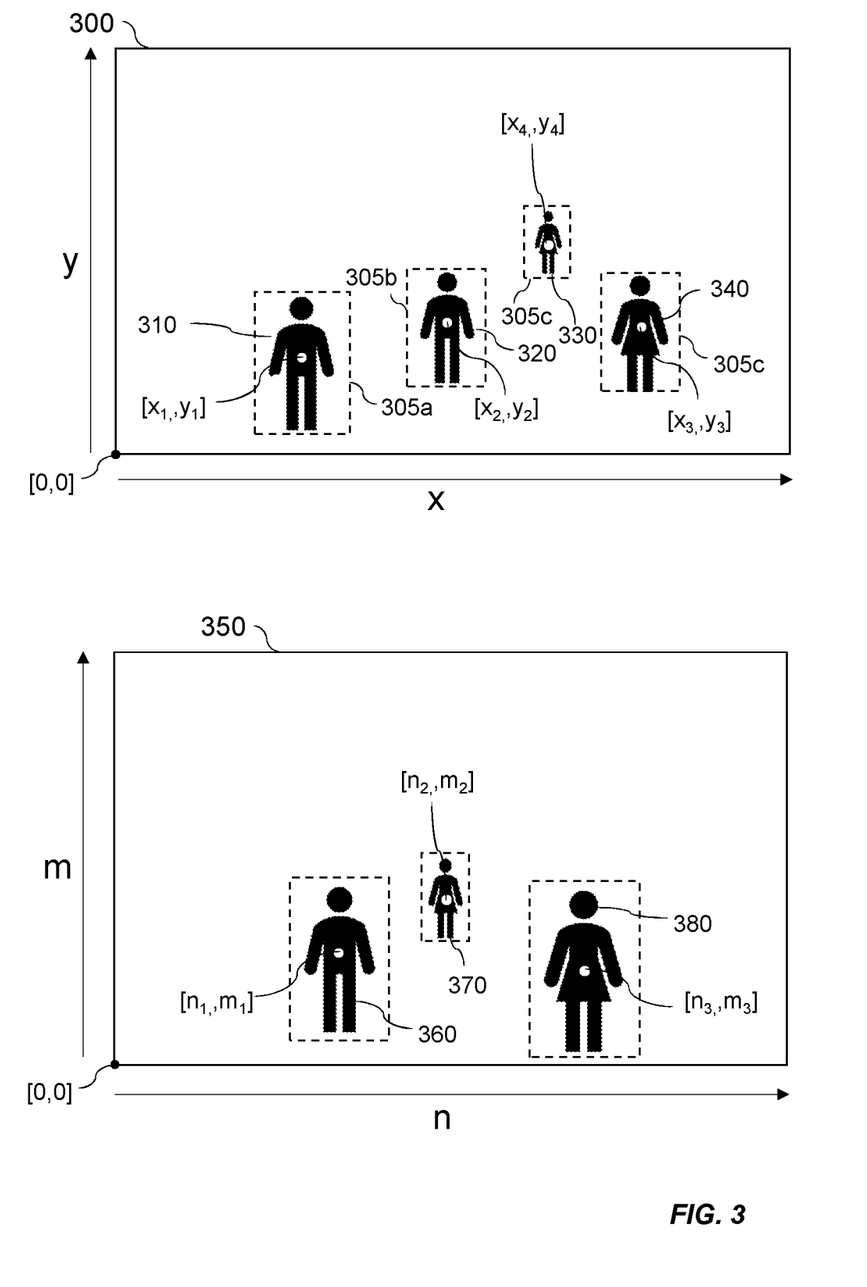
FIG. 3 is a schematic diagram showing a first frame of a scene according to an example and a second frame of a scene according to an example.

FIG. 3 shows an example of a first frame 300 of the scene. The first frame 300 of the scene represents a first view of the scene which may be defined by a number of parameters. For example, the view of the scene captured in the first frame 300 may be associated with a pan value, $P_1$, a tilt value, $T_1$, a zoom value, $Z_1$, a camera coordinate representing a position of the camera used to capture the frame 300 in the relation to the scene, and in some cases an intrinsic parameter associated with a camera used to capture the frame 300, for example a focal length. The first frame 300 shows a number of objects including a first group of objects comprising people 310, 320, 330, and 340, who have been detected in the first frame 300. Each of these objects 310 to 340 is identified inside a respective bounding box 305a to 305d associated with respective coordinates $[x_1, y_1]$, $[x_2, y_2]$, $[x_3, y_3]$, and $[x_4, y_4]$ in the first frame 300. The first collection of coordinate data 135 includes each of the coordinates $[x_1, y_1]$, $[x_2, y_2]$, $[x_3, y_3]$, and $[x_4, y_4]$ associated with the first group of objects 310 to 340.

FIG. 3 also shows an example of a second frame 350 of the scene obtained from image data captured at the same camera position as the first frame 300. The second frame 350 is associated with a different pan value, $P_2$, tilt value, $T_2$, and zoom value, $Z_2$, and in some cases may be associated with a different intrinsic parameter than the first frame 300. For example, where the first frame 300 and second frame 350 are obtained from image data by performing one or more transformations on said image data, the intrinsic parameter values associated with each of the first frame 300 and the second frame 350 may depend on transformations applied to the said image data to obtain each of the first frame 300 and the second frame 350. Alternatively, where the first frame 300 and the second frame are obtained from image data captured from different cameras located at the single camera position, the intrinsic parameters may be dependent on the respective intrinsic parameters of the different cameras. The second frame 350 includes a second group of objects 360, 370, and 380, which in this case are people, who have been detected in the scene. In this example, the scene includes four people, all of whom are visible in the first frame 300 and have been detected as the first group of objects 310 to 340. Only three of the four people in the scene are visible in the second frame 350 and they have been detected as the second set objects 360 to 380. The second group of objects 360 to 380 are each associated with respective coordinates $[n_1, m_1]$, $[n_2, m_2]$, and $[n_3, m_3]$ comprised in a second collection of coordinate data 145.

In an example, the data processing system 100 is configured to transform at least one of the first collection of coordinate data 135 and the second collection of coordinate data 145 such that the first collection of coordinate data 135 and the second collection of coordinate data 145 correspond to a common coordinate system. The data processing system 100 may then determine differences between the first collection of coordinate data 135 and the second collection of coordinate data 145 according to the common coordinate system. By transforming at least one of the collections of coordinate data 135, 145 it is possible to compare estimated positions of the first group of objects 310 to 340 and the second group of objects 360 to 380 in the scene and thereby determine whether any of the first group of objects 310 to 340 are co-located with any of the second group of objects 360 to 380 in the scene, and thereby are likely to correspond to the same object in the scene.

Due to the differences in the characteristics of the first frame 300 and the second frame 350 the estimated locations of the first group of objects 310 to 340 in the scene may be different to the estimated locations of the second group of objects 360 to 380 in the scene. For example, due to the differences in the perspectives provided in each of the first and second views the apparent positions of the centre of the detected objects in the scene may differ between the first frame 300 and the second frame 350. In this case, following the transformation of at least one of the first collection of coordinate data 130 and the second collection of coordinate data 140, there may still be some differences between a first set of coordinates represented by the first collection of coordinate data 135 and a second set of coordinates represented by the second collection of coordinate data 145 even if the first and second sets of coordinates are associated with the same object in the scene. Accordingly, determining whether any of the first group of objects 310 to 340 correspond to any of the second group of objects 360 to 380 comprises, after the transformation of at least one of the first collection of coordinate data 135 and the second set of coordinates 145, determining differences between the first collection of coordinate data 135 and the second collection of coordinate data 145 and comparing these differences to at least one threshold value. If, following the transformation, the determined differences between a first set of coordinates $[x_1, y_1]$ of the first collection of coordinate data 135 and a first set of coordinates $[n_1, m_1]$ of the second collection of coordinate data 145 is above a predetermined threshold value, then the respective objects associated with the first set of coordinates $[x_1, y_1]$ of the first collection of coordinate data 135 and the first set of coordinates $[n_1, m_1]$ of the second collection of coordinate data 145 may be different objects. If, following the transformation, the determined differences between the first set of coordinates $[x_1, y_1]$ of the first collection of coordinate data 135 and the first set of coordinates $[n_1, m_1]$ of the second collection of coordinate data 145 is below the predetermined threshold value, then the respective objects associated with the first set of coordinates $[x_1, y_1]$ of the first collection of coordinate data 135 and the first set of coordinates $[n_1, m_1]$ of the second collection of coordinate data 145 may be the same object in the scene.

In some examples, the data processing system 100 may obtain first calibration data associated with at least one characteristic of the first frame 300, and second calibration data associated with at least one characteristic of the second frame 350. The first calibration data and the second calibration data may be included in the first data 130 and the second data 140 respectively. The first calibration data and the second calibration data may be used to perform the transformation of at least one of the first collection of coordinate data 135 and the second collection of coordinate data 145. The first and second calibration data may include extrinsic camera parameter values associated with the first frame 300 and the second frame 350 respectively. Extrinsic parameter values include, for example, a pan value, $P_v$, a tilt value, $T_v$, and a zoom value, $Z_v$, associated with the respective frames 300, 350 and a location of a camera in the scene, which is used to capture the respective frame 300, 350. The first and second calibration data may also include respective intrinsic parameter values associated with cameras used to capture the respective frames 300, 350. Intrinsic parameter values include, for example, a focal length associated with the frame, and a principal point in the frame.

Transforming at least one of the first collection of coordinate data 135 and the second collection of coordinate data 145 may comprise transforming the first collection of coordinate data 135 and the second collection of coordinate data 145 to a spherical coordinate system. For example, where the first frame 300 and the second frame 350 are obtained from image data captured at a single camera position in the scene, the first collection of coordinate data 135 and the second collection of coordinate data 145 may be transformed to spherical coordinates having an origin at the single camera position.

Figure 4A:
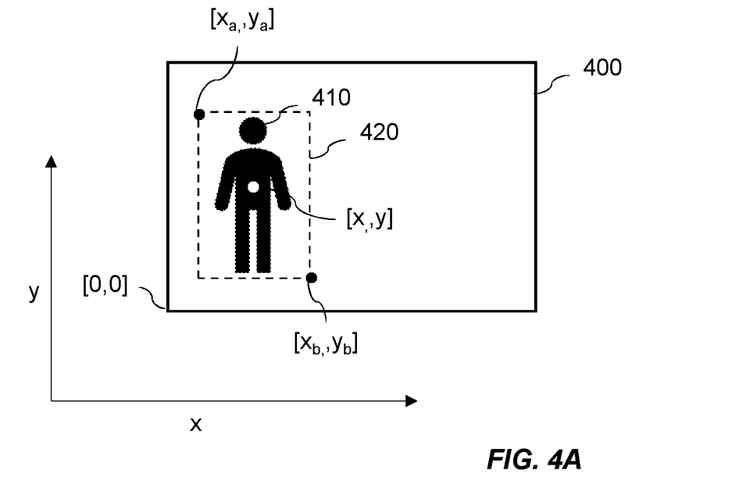
FIG. 4A is a schematic diagram showing first frame, according to an example.
Figure 4B:
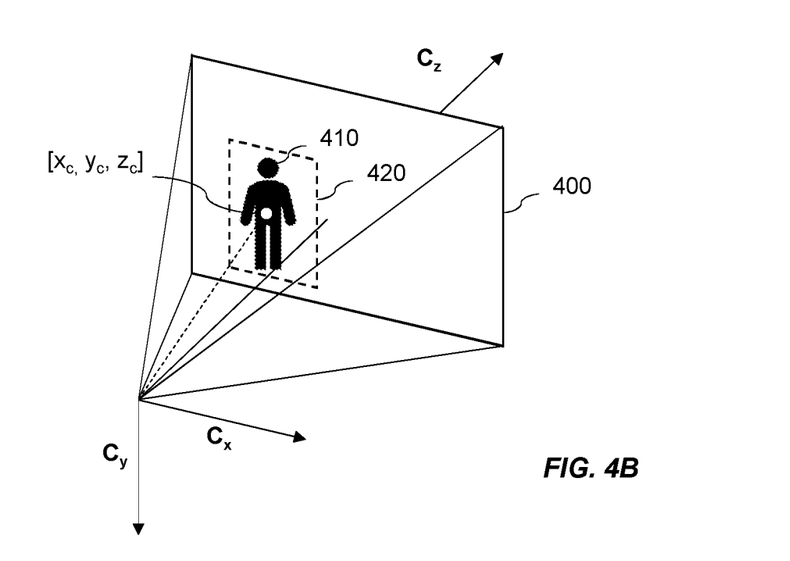
FIG. 4B is a schematic diagram showing the first frame in a camera coordinate system, according to an example.

Transforming a coordinate corresponding to a position in a frame 400 of a scene to a spherical coordinate system will now be described with respect to FIGS. 4A to 4D which show the relative location of a detected object 410 in a number of different coordinate systems during a transformation. The transformation described with reference to FIGS. 4A to 4D shows a transformation applied to coordinates of an object 410 in a frame 400 and may be applied with respect to either of the first collection of coordinate data 135 and the second collection of coordinate data 145 associated with the first frame 300 and the second frame 350 as described above in relation to FIG. 3. FIG. 4A shows a frame 400 of a scene captured by a camera in which an object 410 has been detected. A point [x, y] at which the object 410 is detected is defined as a centre of the bounding box 420, in the frame 400, within which the object 410 is located. This point [x, y] is calculated from the coordinates of corners of the bounding box 420 and, in a first step, is expressed as a three-dimensional vector, as shown below:

$$\begin{bmatrix} x \\ y \\ 1 \end{bmatrix} = \begin{bmatrix} (x_a + x_b)/2 \\ (y_a + y_b)/2 \\ 1 \end{bmatrix} \quad (1)$$

Wherein [xa, ya] are the coordinates in the frame of an upper left corner of the bounding box 420 and [xb, yb] are the coordinates in the frame of the lower right corner of the bounding box 420. The vector representing the point is assigned a Z-axis coordinate value of 1 as no depth information is immediately available from the frame 400. The vector representing the position of the detected object 410 in the frame 400 is then converted to a three-dimensional vector representing the position of the detected object 410 in a camera coordinate system, as shown in FIG. 4B. Equation 2 below shows an example of how the location of the detected object in the frame is converted to the camera coordinate system:

$$\begin{bmatrix} x_c \\ y_c \\ z_c \end{bmatrix} = \alpha \begin{bmatrix} (x - c_x)/f \\ (y - c_y)/f \\ 1 \end{bmatrix} \quad (2)$$

Wherein $[x_c, y_c, z_c]$ represents the location of the detected object 410 in the camera coordinate system, $[c_x, c_y]$ are the coordinates of the principal point, in other words the point on the image plane onto which the perspective centre is projected, f is the focal length of the camera used to capture the frame 400, and a is a normalization factor.

The focal length f, and the principal point $[c_x, c_y]$, are intrinsic parameters of the camera and can be expressed in a matrix:

$$I = \begin{bmatrix} f & 0 & c_x \\ 0 & f & c_y \\ 0 & 0 & 1 \end{bmatrix} \quad (3)$$

Figure 4C:
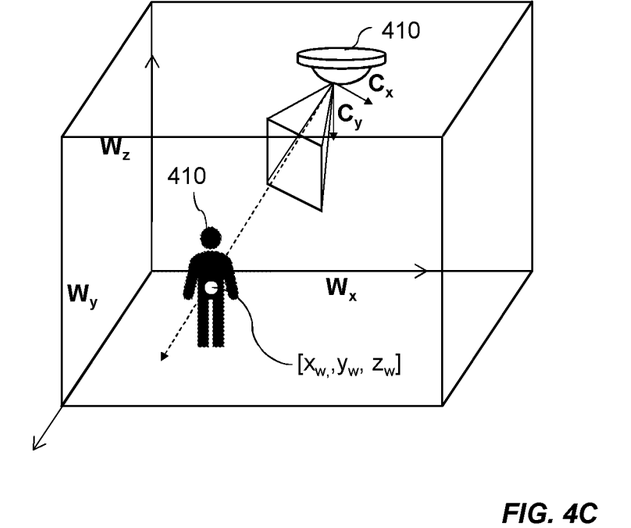
FIG. 4C is a schematic diagram showing the camera coordinate system in relation to a world coordinate system, according to an example.

After determining the three-dimensional vector $[x_c, y_c, z_c]$ in the camera coordinate system, the vector $[x_c, y_c, z_c]$ is converted from camera coordinates to a world coordinate system by suitable translation and rotation functions, as shown in the expression below:

$$\begin{bmatrix} x_w \\ y_w \\ z_w \end{bmatrix} = R \left( \begin{bmatrix} x_c \\ y_c \\ z_c \end{bmatrix} - T \right) \quad (4)$$

Wherein $[x_w, y_w, z_w]$ represents the location of the detected object 410 in a world coordinate system, as illustrated in FIG. 4C, R represents a rotation, and T represents a translation used to map the origin of the camera coordinate system to the origin of the world coordinate system. The rotation R and the translation T can be expressed in matrix form, as shown below:

$$R = \begin{bmatrix} r_{11} & r_{12} & r_{13} \\ r_{21} & r_{22} & r_{23} \\ r_{31} & r_{32} & r_{33} \end{bmatrix} \quad (5)$$

$$T = \begin{bmatrix} t_x \\ t_y \\ t_z \end{bmatrix} \quad (6)$$

Wherein the elements in the matrix expressions of R and T are determined from extrinsic parameters associated with the frame 400 in which the object 410 is detected including, for example, a respective pan value, Pv, tilt value, Tv, zoom value, Zv, and the coordinates of the location of the camera position in the world coordinate system $[x_w^{cam}, y_w^{cam}, z_w^{cam}]$.

Figure 4D:
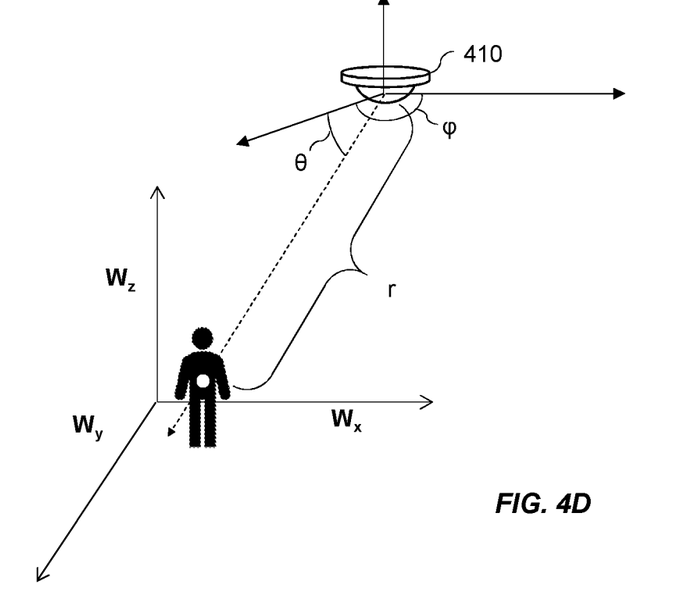
FIG. 4D is a schematic diagram showing the world coordinate system in relation a spherical coordinate system with an origin at the camera, according to an example.

The coordinates $[x_w, y_w, z_w]$ of the detected object 410 in the world coordinate system are then converted to spherical coordinates, as shown in FIG. 4D, by determining angular values θ, φ, and a radius r using the following expressions:

$$\begin{bmatrix} x_{fc} \\ y_{fc} \\ z_{fc} \end{bmatrix} = \begin{bmatrix} x_w - x_w^{cam} \\ y_w - y_w^{cam} \\ z_w - z_w^{cam} \end{bmatrix} \quad (7)$$

$$r = \sqrt{x_{fc}^2 + y_{fc}^2 + z_{fc}^2} \quad (8)$$

$$\varphi = \arctan\left(\frac{y_{fc}}{x_{fc}}\right) \quad -180 \le \varphi \le 180 \quad (9)$$

$$\theta = \arccos\left(\frac{z_{fc}}{r}\right) \quad 0 \le \theta \le 180 \quad (10)$$

Once the first collection of coordinate data 135 and the second collection of coordinate data 145 have been transformed to a spherical coordinate system, the positions of the first group of objects 310 to 340 and the second group of objects 360 to 380 in the scene can be compared.

Comparing the location of a first object 310 of the first group of objects 310 to 340, associated with a first set of spherical coordinates $[\theta_1, \varphi_1, r_1]$, and a location of a first object 360 of the second group of objects 360 to 380, associated with a second set of spherical coordinates $[\theta_2, \varphi_2, r_2]$, may include determining angular separations between the respective coordinates as expressed below:

$$\Delta\varphi = \varphi_1 - \varphi_2 \quad (11)$$

$$\Delta\theta = \theta_1 - \theta_2 \quad (12)$$

The angular separations Δφ and Δθ may then be compared to one or more thresholds and the result of this comparison is used to determine whether the first object 310 of the first group of objects 310 to 340 and the first object 360 of the second group of objects 360 to 380 correspond to the same object in the scene. Such a comparison may be performed between each of the first group of objects 310 to 340 and each of the second group of objects 360 to 380.

Determining whether any of the first group of objects 310 to 340 correspond to any of the second group of objects 360 to 380 using the first collection of coordinate data 135 and the second collection of coordinate data 145 may be less computationally expensive than alternative techniques using object recognition. Similarly, the requirements of image resolution for accurately performing object detection may be lower than for the same degree of accuracy when performing object recognition. Consequently, the requirements of image data and camera resolution may be lower, and hence more scalable, than when using alternative methods.

In some examples, the result of the comparison determines whether any of the first group of objects 310 to 340 are the same as any of the second group of objects 360 to 380. Alternatively, the result of the comparison may be used to supplement, in other words to assist, in the determination of whether any of the first group of objects 310 to 340 are the same as any of the second group of objects 360 to 380. For example, where a scene comprises many, closely located, objects, it may be desirable to reduce a frequency of false duplicate detection of objects in the first frame 300 and the second frame 350 which occurs when using the result of the comparison as the only criteria for the determination. In this case, the comparison of the relative positions of the first group of objects 310 to 340 and the second group of objects 360 to 380, on the basis of their transformed collections of coordinate data, may be used to determine a probability distribution over the objects indicating a likelihood of duplication between the first group of objects 310 to 340 and the second group of objects 360 to 380. This probability distribution may be used in conjunction with other criteria, for example object recognition, to determine whether any of the first group of objects 310 to 340 are the same object as any of the second group of objects 360 to 380.

In an example, the data processing system 100 applies one or more objected recognition algorithms to image data representing the first group of objects 310 to 340 and to image data representing the second group of objects 360 to 380 to identify at least some of the first group of objects 310 to 340 and the second group of objects 360 to 380. The data processing system may then determine whether any of the first group of objects 310 to 340 correspond to any of the second group of objects 360 to 380 based on the first collection of coordinate data 135, the second collection of coordinate data 145, and the identified objects of the first group of objects 310 to 340 and the second group of objects 360 to 380.

In other examples, rather than determining an angular separation between spherical coordinates representing a position of a first object 310 of the first group of objects 310 to 340 and a position of a first object 360 of the second group of objects 360 to 380, the relative positions of these objects can be compared on the basis of their relative location compared to the origin of the spherical coordinate system, which corresponds to the single camera position. For example, the single camera position may correspond to the location of a single camera having one or more image sensors or, where a multi-camera system is used, a location in the multi-camera system which is equidistant from each of the cameras in the multi-camera system. Where the first frame 300 and the second frame 350 are captured using a single image sensor the origin of the spherical coordinate system may be the location of the single image sensor used to generate image data from which both frames 300 and 350 are obtained. Continuing from expression (7) above, a difference value δ can be determined by:

$$\delta = \arccos\left(\left(\begin{bmatrix} x1_{fc} \\ y1_{fc} \\ z1_{fc} \end{bmatrix} * \begin{bmatrix} x2_{fc} \\ y2_{fc} \\ z2_{fc} \end{bmatrix}\right) \bigg/ \left(\left\|\begin{bmatrix} x1_{fc} \\ y1_{fc} \\ z1_{fc} \end{bmatrix}\right\| \cdot \left\|\begin{bmatrix} x2_{fc} \\ y2_{fc} \\ z2_{fc} \end{bmatrix}\right\|\right)\right) \quad (13)$$

Wherein $$\begin{bmatrix} x1_{fc} \\ y1_{fc} \\ z1_{fc} \end{bmatrix}$$

represents the $$\begin{bmatrix} x_{fc} \\ y_{fc} \\ z_{fc} \end{bmatrix}$$

coordinates of the first object 310 of the first group of objects 310 to 340 and $$\begin{bmatrix} x2_{fc} \\ y2_{fc} \\ z2_{fc} \end{bmatrix}$$

represents the $$\begin{bmatrix} x_{fc} \\ y_{fc} \\ z_{fc} \end{bmatrix}$$

coordinates of the first object 360 of the second group of objects 360 to 380. The value δ is then compared to a threshold value and the result of this comparison is used to determine whether any of the first group of objects 310 to 340 are the same as any of the second group of objects 360 to 380.

In alternative examples, either of the first collection of coordinate data 135 or the second collection of coordinate data 145 is transformed such that the transformed collection of coordinate data corresponds to the same reference frame as the other of the first collection of coordinate data 135 and the second collection of coordinate data 145. Differences between the coordinates represented by the coordinate data 135, 145 may then be determined in that reference frame, and duplicate object detection is identified on the basis of the determined differences.

In some cases, depth information may be obtained and used to supplement and/or modify the detection of duplicate objects in the first group of objects 310 to 340 and the second group of objects 360 to 380. For example, the method 200 may include obtaining a set of depth estimations, each depth estimation being associated with a respective one of the first group of objects 310 to 340 and the second group of objects 360 to 380. The set of depth estimations may be comprised in the first data 130 and the second data 140 provided to the data processing system 100. Determining differences between the first collection of coordinate data 135 and the second collection of coordinate data 145 may include determining differences between respective depth estimations included in the first data 130 and the second data 140. For example, where the angular differences $\Delta\varphi$ and $\Delta\theta$ between coordinates associated with a first object 310 of the first group of objects 310 to 340 and coordinates associated with a first object 360 of the second group of objects 360 to 380 are below one or more predetermined thresholds, the method 200 may include comparing a first depth estimation $d_1$ associated with the first object 310 of the first group of objects 310 to 340 with a second depth estimation $d_2$ associated with the first object 360 of the second group of objects 360 to 380. In this way, it can be determined whether two objects detected in the scene relate to the same object or whether they relate to two objects which are closely angularly aligned, with respect to the origin of the spherical coordinate system, but which are radially separated.

Figure 5:
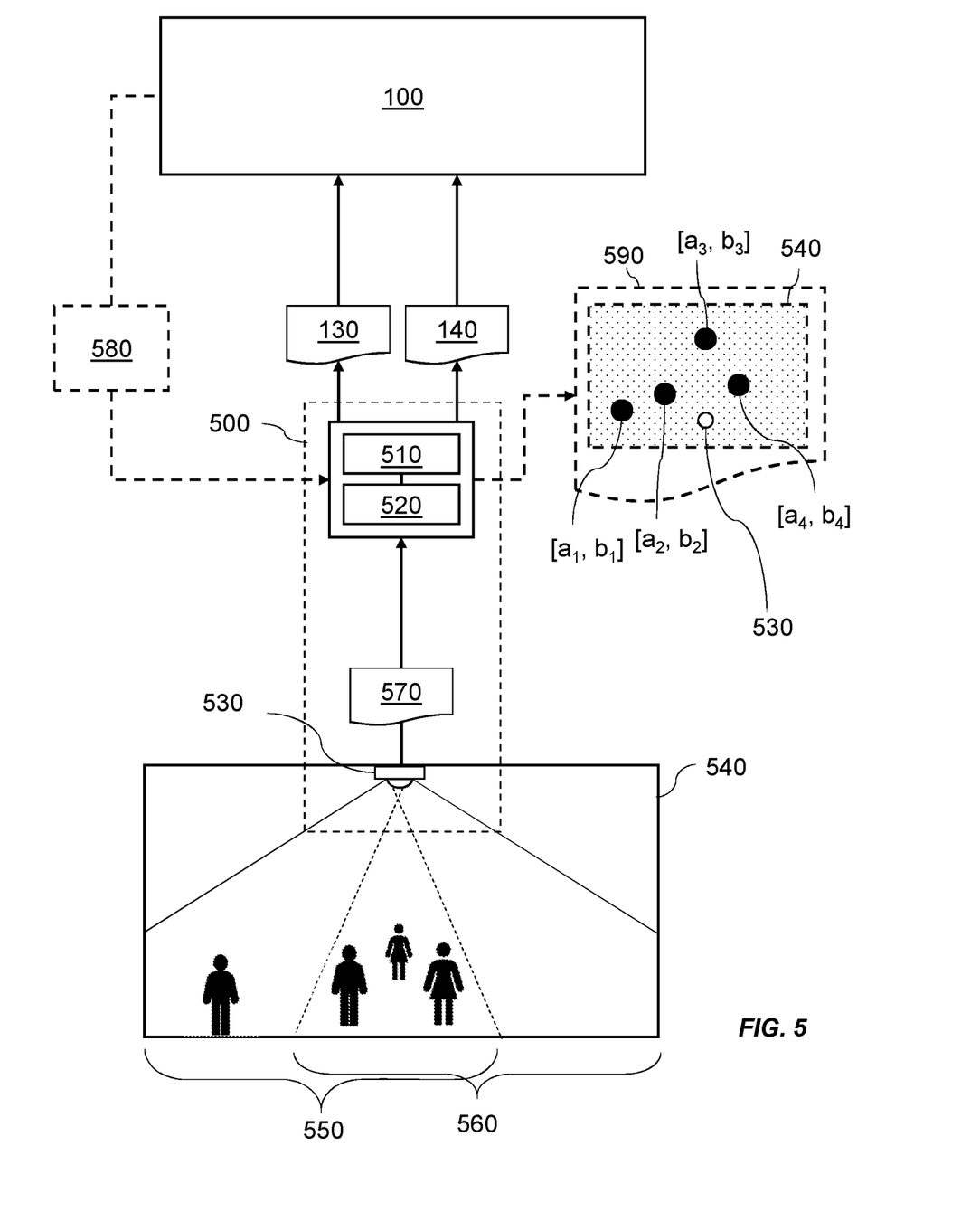
FIG. 5 is a schematic diagram showing the data processing system, an image processing system, and a scene according to an example.

FIG. 5 shows the data processing system 100 communicatively coupled to an image processing system 500. The image processing system 500 comprises at least one processor 510, at least one memory 520, and at least one camera 530 at a single camera position. In the example shown in FIG. 5, the at least one camera 530 is a camera with a single image sensor and a wide-angle lens, for example a fish-eye lens. The at least one processor 510 and at least one memory 520 are communicatively coupled to the at least one camera 530. In some examples, the at least one processor 510 and at least one memory 520 are located with and/or directly connected to the at least one camera 530. Alternatively, the at least one camera 530 may be in communication with the at least one processor 510 and the at least one memory 520 over a network, such as a local area network.

The at least one memory 520 comprises computer-readable instructions which, when executed by the at least one processor 510, cause the at least one processor 510 to perform a series of steps. The steps include obtaining first image data representing a first frame 300 of a scene 540 using the at least one camera 530 and obtaining second image data representing a second frame 350 of the scene 540 using the at least one camera 530, wherein the second frame 350 represents a different view of the scene 540 than the first frame 300.

In the present example, obtaining the first image data comprises applying at least one transformation to at least part of third image data 570 representing a frame captured from the single camera position to adjust a geometric distortion of the frame. The third image data 570 is generated using the at least one camera 530 at the single camera position. In the present example, the first frame 300 is represented by the field of view 550 shown on the left side of the scene 540 in FIG. 5. Similarly, obtaining the second image data comprises applying at least one transformation to at least part of the third image data 570 representing a frame captured from the single camera position to adjust a geometric distortion of the frame. The second frame 350 is represented by the field of view 560 shown in the right side of the scene 540 in FIG. 5. In some examples, the first frame 300 and the second frame 350 are generated at least in part from the same image data, the image data having been captured by a single camera. For example, where the third image data 570 is captured using a single camera, the first frame 300 and the second frame 350 may each be generated by applying a transformation, or transformations, to respective parts of the third image data 570. In other words, a first part of the third image data 570 used to generate the first frame 300 may include at least some of a second part of the third image data 570 which is used to generate the second frame 350.

Generating the first image data representing the first frame 300 may also comprise generating first calibration data associated with at least one characteristic of the first frame 300, for example, a pan value, $P_v$, a tilt value, $T_v$, and a zoom value, $Z_v$. The first calibration data may be determined based on the at least one transformation applied to at least part of the third image data 570 to generate the first image data. Similarly, second calibration data associated with at least one characteristic of the second frame 350 may be generated by the image processing system 500 based on the at least one transformation applied to at least part of the third image data 570 to generate the second image data representing the second frame 350.

In examples where the at least one camera 530 comprises one or more moveable cameras for example, cameras mounted on a gimbal and including one or more variable lenses, the first and second calibration data may be determined from the at least one camera 530.

The computer-readable instructions stored in the at least one memory 520 may then cause the processor 510 to apply one or more object detection algorithms to generate a first collection of coordinate data 135 representing positions of a first group of objects 310 to 340 detected in the first frame 300 and to generate a second collection of coordinate data 145 representing positions of a second group of objects 360 to 380 detected in the second frame 350. The image processing system 500 is configured to transmit first data 130, comprising the first collection of coordinate data 135, and second data 140, comprising the second collection of coordinate data 145, for receipt by the data processing system 100. The first data 130 and the second data 140 may also comprise the first calibration data and the second calibration data respectively.

By transmitting the first collection of coordinate data 135 and second collection of coordinate data 145 to the data processing system 100 and maintaining the image data 570 captured by the camera locally within the image processing system 500 it is possible to reduce the likelihood of private video or image data from being compromised. For example, where the image processing system 500 is located in a sensitive location, such as a bank, it may be desirable to prevent image data 570 captured inside the sensitive location from being transmitted outside of the secure local area network.

In some cases, the data processing system 100 is located within the same local network as the image processing system 500 and in such a case any of the functions performed by the image processing system 500 may alternatively be performed by the data processing system 100 without increasing a vulnerability of sensitive data. However, it may be desirable to use cloud computing resources and external services to implement the data processing system 100, due to the computational expense of the processes described. Hence, by transmitting data comprising only coordinates and/or calibration data to the data processing system 100, it is possible to prevent sensitive data from being distributed externally.

The image processing system 500 may also generate the set of depth estimations associated with the first group of objects 310 to 340 and the second group of objects 360 to 380. For example, the image processing system 500 may apply one or more monocular depth estimation algorithms to image data representing the first frame 300 and image data representing the second frame 350 to determine an estimated depth of each of the first group of objects 310 to 340 and each of the second group of objects 360 to 380. These depth estimations may be associated with the respective coordinates of the first collection of coordinate data 135 and the second collection of coordinate data 145 and be included in the first data 130 and the second data 140.

In other examples, the image processing system 500 may generate the set of depth estimations using other methods. For example, using a stereoscopic arrangement of image sensors either included in the camera 530 or communicatively coupled to the camera 530. Other examples include the use of devices such as ultrasonic or laser distance meters, and/or using phase detection autofocus (PDAS) pixels to determine the depth of objects in the scene.

In some examples, the data processing system 100 may generate object location data 580 comprising an indication of whether any of the first group of objects 310 to 340 correspond to any of the second group of objects 360 to 380 in the scene. The data processing system 100 may provide feedback to the image processing system 500 in the form of the object location data 580. The image processing system 500 may receive the object location data 580 and generate a mapping 590 of the objects in the scene based on the object location data 580 and scene data representing a layout of the scene. The mapping 590 may include a third collection of coordinate data, comprising coordinates $[a_1, b_1]$, $[a_2, b_2]$, $[a_3, b_3]$, and $[a_4, b_4]$ representing positions of objects in layout of the scene. In other examples, the data processing system 100 may receive the scene data and use the scene data to determine the third collection of coordinate data representing positions of objects in the layout of the scene 540 from the first collection of coordinate data 135, the second collection of coordinate data 145, and the determining of whether any of the first group of objects 310 to 340 correspond to any of the second group of objects 360 to 380 in the scene.

Determining whether any of the first group of objects 310 to 340 correspond to any of the second group of objects 360 to 380 can be used to modify and/or recalibrate the frames 300, 350 which are captured by the at least one camera 530. For example, where at least one transformation is applied to the third image data 570 to obtain either of the first fame 300 and the second frame 350, the at least one transformation applied to the third image data 570 generated by the at least one camera 530 may be modified to alter either of the first frame 300 of the scene or the second frame 350 of the scene. For example, to change a pan value, a tilt value, or a zoom value, associated with either of the frames 300 and 350. This may be performed to reduce a likelihood that any of the first group of objects 310 to 340 correspond to any of the second group of objects 360 to 380. For example, there may initially be a large overlapping region between the first frame 300 and the second frame 350. Following a determination that a large proportion of the first group of objects 310 to 340 are also included in the second frame 350 as the second group of objects 360 to 380 either of the first frame 300 or the second frame 350 may be modified to reduce the overlapping region.

In some examples, the at least one camera 530 may include two or more cameras located at the single camera position. For example, two cameras included in a single camera housing such as in a dome camera system. In this case, the two more cameras may be fixed, and transformations applied to image data generated by any of the two or more cameras may be modified to alter frames obtained from said image data. In other examples, the at least one camera 530 may include two or more cameras in a multi-camera system wherein at least one of the two or more cameras is independently moveable, for example by the inclusion of suitable actuation equipment, to allow a pan or tilt of the camera to be altered. The moveable camera may be moved by passing a suitable signal to the actuation equipment to alter the view captured by the moveable camera. Any of the cameras included in the at least one camera 530 may also include a variable lens with which the zoom and/or focal length of the lens can be modified.

The above embodiments are to be understood as illustrative examples of the invention. Further embodiments of the invention are envisaged. For example, the image processing system may be adapted to modify the object detection which is performed. Where two objects in the scene are positioned close to one another it may be difficult to accurately identify which of the detected objects in the first frame and the second frame are the same. For example, where the differences in position between two objects in the first frame are similar to the differences in position between either of the two objects in the first frame and at least one object in the second frame, it may not be possible to readily identify which of the objects corresponds to a duplicate detection. In this case, the image processing system 500 may be adapted to modify the object detection to detect a smaller part of each of the objects in the scene, in other words rather than detecting a person, the object detection may be reconfigured to detect a head of a person. This may allow differences in the positions of the objects to be more accurately analysed. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method comprising:
    obtaining first data comprising a first collection of coordinate data representing a position, or positions, of a first group of one or more objects detected in a first frame of a scene;
    obtaining second data comprising a second collection of coordinate data representing a position, or positions, of a second group of one or more objects detected in a second frame of the scene, wherein the second frame represents a different view of the scene than the first frame; and
    determining whether any of the first group of objects correspond to any of the second group of objects in the scene based on the first collection of coordinate data and the second collection of coordinate data,
    wherein the first frame and the second frame are obtained from image data captured from a single camera position,
    wherein determining whether any of the first group of objects correspond to any of the second group of objects comprises:
    transforming at least one of the first collection of coordinate data and the second collection of coordinate data such that the first collection of coordinate data and the second collection of coordinate data correspond to a common coordinate system; and determining differences between the first collection of coordinate data and the second collection of coordinate data according to the common coordinate system.

2. The computer-implemented method of claim 1, wherein the first data comprises first calibration data associated with at least one characteristic of the first frame, the second data comprises second calibration data associated with at least one characteristic of the second frame, and
wherein the transforming of at least one of the first collection of coordinate data and the second collection of coordinate data includes using the first calibration data and the second calibration data.

3. The computer-implemented method of claim 2, wherein transforming at least one of the first collection of coordinate data and the second collection of coordinate data comprises transforming the first collection of coordinate data and the second collection of coordinate data to a spherical coordinate system.

4. The computer-implemented method of claim 1, comprising obtaining a set of depth estimations each depth estimation being associated with a respective object of the first group of objects and the second group of objects, wherein determining differences between the first collection of coordinate data and the second collection of coordinate data includes determining differences between respective depth estimations.

5. The computer-implemented method of claim 4, wherein the set of depth estimates are determined by applying one or more monocular depth estimation algorithms to image data representing the first frame and image data representing the second frame.

6. The computer-implemented method of claim 1, wherein the first frame and second frame are each generated by applying at least one transformation to at least part of the image data captured from the single camera position to adjust a geometric distortion of a frame represented by the image data.

7. The computer-implemented method of claim 6, wherein the first frame and the second frame are generated at least in part from the same image data, the image data having been captured by a single camera.

8. The computer-implemented method of claim 6, wherein generating the first frame and the second frame comprises generating first calibration data associated with at least one characteristic of the first frame and generating second calibration data associated with at least one characteristic of the second frame.

9. The computer-implemented method of claim 1, wherein determining whether any of the first group of objects correspond to any of the second group of objects, comprises:
applying one or more object recognition algorithms to image data representing the first group of objects and to image data representing the second group of objects to identify at least some of the first group of objects and the second group of objects; and
determining whether any of the first group of objects correspond to any of the second group of objects based on the first collection of coordinate data, the second collection of coordinate data, and the identifying of at least some of the first group of objects and the second group of objects.

10. The computer-implemented method of claim 6, comprising, based on the determining of whether any of the first group of objects correspond to any of the second group of objects, modifying the at least one transformation applied to the image data captured from the single camera position to adjust the geometric distortion of the frame to alter either of the first view of the scene and second view of the scene, whereby to reduce a likelihood that any of the first group of objects correspond to any of the second group of objects.

11. The computer-implemented method of claim 1, comprising obtaining scene data representing a layout of the scene, and, using the scene data, determine a third collection of coordinate data representing positions of objects in the layout of the scene from the first collection of coordinate data and the second collection of coordinate data.

12. A data processing system comprising at least one memory and at least one processor, wherein the data processing system is configured to:
obtain first data comprising a first collection of coordinate data representing a position, or positions, of a first group of one or more objects detected in a first frame of a scene;
obtain second data comprising a second collection of coordinate data representing a position, or positions, of a second group of one or more objects detected in a second frame of the scene, wherein the second frame represents a different view of the scene than the first frame; and
determine whether any of the first group of objects correspond to any of the second group of objects in the scene based on the first collection of coordinate data and the second collection of coordinate data,
wherein the first frame and the second frame are obtained from image data captured from a single camera position, and
wherein the data processing system is configured to determine whether any of the first group of objects correspond to any of the second group of objects based on:
transforming at least one of the first collection of coordinate data and the second collection of coordinate data such that the first collection of coordinate data and the second collection of coordinate data correspond to a common coordinate system; and
determining differences between the first collection of coordinate data and the second collection of coordinate data according to the common coordinate system.

13. An image processing system comprising:
at least one camera at a single camera position;
at least one processor; and
at least one memory comprising computer-readable instructions which, when executed by the at least one processor, cause the at least one processor to:
obtain first image data representing a first frame of a scene using the at least one camera;
obtain second image data representing a second frame of the scene using the at least one camera, wherein the second frame represents a different view of the scene than the first frame;
apply one or more object detection algorithms to generate a first collection of coordinate data representing a position, or positions, of a first group of one or more objects detected in the first frame and to generate a second collection of coordinate data representing a position, or positions, of a second group of one or more objects detected in the second frame; and
transmit first data comprising the first collection of coordinate data and second data comprising the second collection of coordinate data for receipt by a data processing system of claim 12, wherein the at least one memory further comprises computer-readable instructions which, when executed by the at least one processor, cause the at least one processor to:

obtain each of the first image data and the second image data by applying at least one transformation to third image data representing a frame captured from the single camera position to adjust a geometric distortion of the frame.

14. The image processing system of claim 13, wherein the at least one memory further comprises computer-readable instructions which, when executed by the at least one processor, cause the at least one processor to:

receive object location data comprising an indication of whether any of the first group of objects correspond to any of the second group of objects; and generate a mapping of objects in the scene based on the object location data and scene data representing a layout of the scene.

15. The image-processing system of claim 13, configured to receive an indication of whether any of the first group of objects correspond to any of the second group of objects and, in response to the received indication, modify the at least one transformation applied to the image data to adjust the geometric distortion of the frame to alter either of the first frame of the scene and second frame of the scene, whereby to reduce a likelihood that any of the first group of objects correspond to any of the second group of objects.

* * * * *